United States Patent [19]
Hibino et al.

[11] Patent Number: 5,182,483
[45] Date of Patent: Jan. 26, 1993

[54] SQUIRREL-CAGE ROTOR WITH SHAPED-CONDUCTOR HARMONIC REDUCTION

[75] Inventors: Sadayoshi Hibino, Suzuka; Tadayuki Sato, Mie; Motoyasu Mochizuki, Aichi, all of Japan

[73] Assignee: Kabushiki Kaisha Toshiba, Kanagawa, Japan

[21] Appl. No.: 634,574

[22] Filed: Dec. 27, 1990

[30] Foreign Application Priority Data

Dec. 28, 1989 [JP] Japan .................................. 1-344377
Mar. 30, 1990 [JP] Japan .................................. 2-85725
Mar. 30, 1990 [JP] Japan .................................. 2-85726
Oct. 26, 1990 [JP] Japan .................................. 2-290499

[51] Int. Cl.⁵ .......................................... H02K 17/16
[52] U.S. Cl. ..................................... 310/211; 310/125
[58] Field of Search .............. 125/211, 216, 218, 212, 125/125, 186, 193

[56] References Cited

U.S. PATENT DOCUMENTS

| 3,027,474 | 3/1962 | Rosenberry, Jr. | 310/211 |
| 3,778,652 | 12/1973 | Endress | 310/211 |
| 4,268,772 | 5/1981 | Workman | 310/211 |

FOREIGN PATENT DOCUMENTS

| 883524 | 7/1943 | France | 310/211 |
| 54171 | 4/1948 | France | 310/211 |
| 52-17045 | 4/1977 | Japan . | |
| 64-81147 | 3/1989 | Japan . | |

OTHER PUBLICATIONS

AIEE, vol. 77, pp. 43-53, "Stray-Load Losses and Stray Torques in Induction Machines," Adnan M. Odok, Apr. 1958, Conference Proceedings, Dayton, OH.

Primary Examiner—Steven L. Stephan
Assistant Examiner—D. L. Rebsch
Attorney, Agent, or Firm—Philip M. Shaw, Jr.

[57] ABSTRACT

A squirrel-cage rotor includes a rotor core composed of steel sheets. Each steel sheet has in the outer circumference a number of slot-forming punched portions along the outer circumference thereof, each punched portion including a main portion and an additional portion inclined toward one of two sides along the outer circumference of the rotor relative to the position of the main portion, such that each punched portion has an unsymmetrical shape. The units include those formed by laminating the steel sheets having the respective additional portions inclined in the direrction of one side, and those formed by laminating the steel sheets having the respective additional portions inclined toward the other side. Slots are formed so as to be parallel with the rotor axis. The center line 1 of each main portion is deviated from a distal end of each additional portion by a distance d satisfying the following expression (A) in the direction of the outer periphery of the rotor:

$$\frac{\pi D}{4(z + p)} \leq d \leq \frac{\pi D}{4(z - p)} \quad (A)$$

where
D = rotor diameter
z = the number of stator slots
p = the number of pole pairs

10 Claims, 11 Drawing Sheets

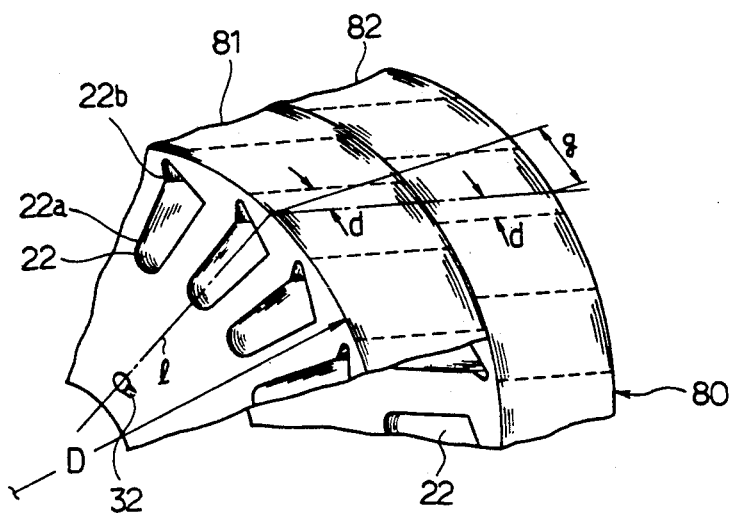
FIG. 21
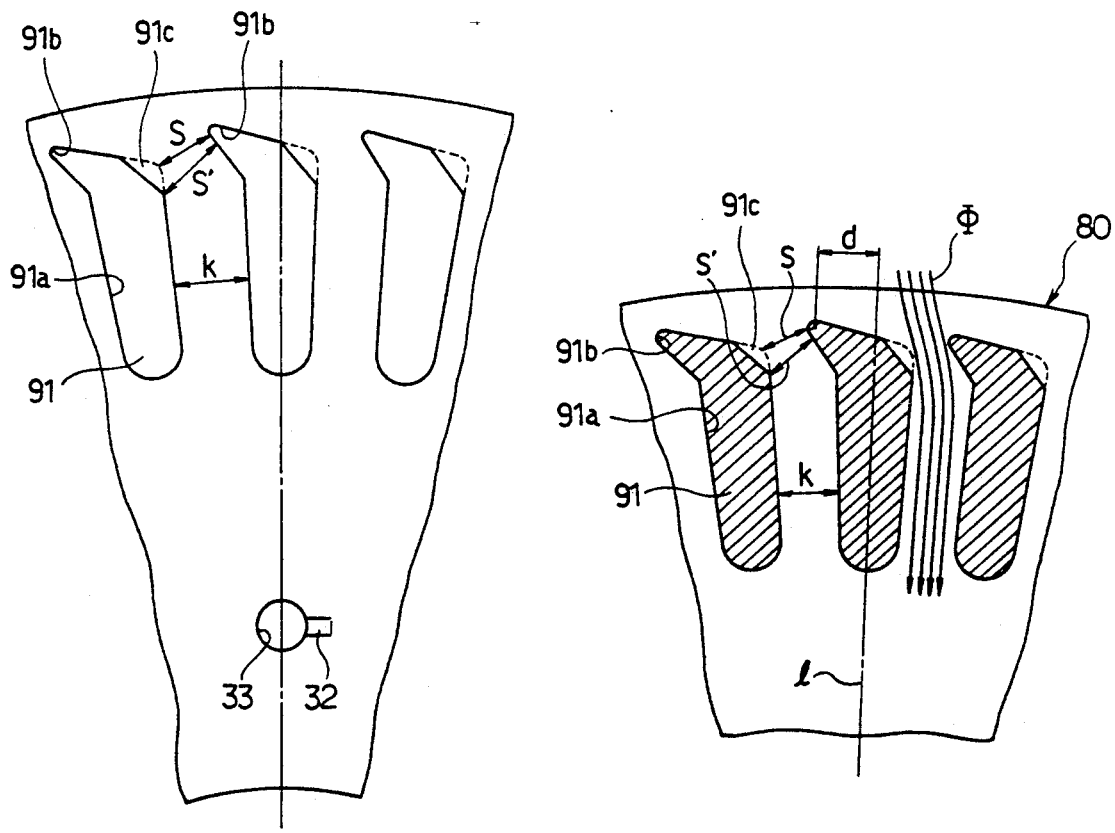
FIG. 22
FIG. 23

SQUIRREL-CAGE ROTOR WITH SHAPED-CONDUCTOR HARMONIC REDUCTION

BACKGROUND OF THE INVENTION

This invention relates to a squirrel-cage rotor having a rotor core with slots and rotor bars embedded in the slots.

Generally, in the squirrel-cage rotor of the above-described type, a laminated rotor core is formed by laminating a number of steel sheets each having a plurality of slot forming punched portions previously formed in the outer circumference thereof by way of pressing or the like. The rotor bars with integral end rings are embedded in the slots by way of aluminum casting.

In accordance with the above-described construction, magnetic fluxes entering the rotor core from a stator via an air-gap during drive of the rotor contain harmonics. The harmonics in the magnetic fluxes cause a harmonic electromotive force in the rotor bars. Such a harmonic electromotive force acts as an abnormal torque against the rotor, and consequently induces a pulsating torque or causes vibration or noise.

Conventionally, the slots in which the rotor bars are embedded are skewed in order that undesirable influences of the harmonics may be restrained. In this method, when the steel sheets are laminated, the positions of the slot forming punched portions of the rotor are slightly deviated circumferentially of the rotor in turn. For example, the positions of the punched portions are deviated by one pitch of stator slots in sum. As a result, the phases of the electromotive force induced in the rotor bars by the harmonics are deviated slightly from portion to portion of one rotor bar. Consequently, the harmonics due to the whole electromotive force are canceled, and occurrence of the abnormal torque is restrained.

However, the following disadvantages are found in the above-described conventional construction. First, specific jigs are needed for adjusting the pitch of the rotor slots when the steel sheets are laminated with the slots skewed and the adjustment needs a lot of time. Particularly, when the slots are of the completely closed type, a lot of time is needed since the slot positions cannot be visually confirmed from the outer peripheral side in the state that the steel sheets have been laminated. Accordingly, the production cost of the rotor is increased. In skewing the slots, the skewing effect is reduced to a large extent unless an amount of skewing is properly set. A proper amount of skewing has not been established in theory and therefore, trial manufactures need to be made so that the proper amount of skewing is determined, resulting in increase in the production cost.

Second, when the rotor bars are usually embedded in the skewed slots of the laminated core, a metal such as aluminum needs to be cast into the slots. In this case, defect portions such as a gas pocket occur in stepped portions of the laminated steel sheets formed within the slots. Such defect portions unbalance the weight distribution of the rotor and therefore, the rotational stability is reduced, particularly, at the time of the high speed rotation.

Third, in the case of the conventional rotor with the skewed slots, arrangement and shape of the slots formed in both stator and rotor sometimes causes an abnormal torque called "position torque" depending upon positions of the stator and rotor relative to each other at starting. More specifically, when the amount of skewing is less than one pitch of the stator slots, the magnitude of torque which the rotor receives from the stator at starting changes in accordance with the position of the rotor. To restrain the position torque, the above-described amount of skewing is further increased to the value exceeding one pitch of the stator slots. Thus, the amount of skewing is increased in accordance with a stop position of the rotor, thereby restraining the position torque. However, when the amount of skewing is increased as described above, slot sections of the rotor are not effectively utilized. Consequently, the temperature of the rotor is increased or the characteristic thereof is lowered.

In order to obviate the above-described defects of the skewed rotor, it has been proposed to gain the skewing effect without actually skewing the slots at the time of lamination of the steel sheets. For example, Japanese Published Utility Model Reg. Application (Kokoku) No. 52-17045 discloses an opening or bridge portion of each slot deviated relative to the slot center line. In this case, however, the theoretical amount of deviation is not presented and the skewing effect cannot be found when the amount of deviation of each steel she et is improper. Thus, an optimum value of deviation needs to be learned from experiments when the above-described invention is actually applied, thereby increasing the design cost.

SUMMARY OF THE INVENTION

Therefore, an object of the present invention is to provide an improved squirrel-cage rotor wherein an abnormal torque, vibration and noise can sufficiently be restrained without skewing the slots or with only a small amount of skewing applied to the slots.

The present invention provides a squirrel-cage rotor comprising a rotor core formed by laminating a plurality of steel sheets each having in the outer circumference thereof a number of slot-forming punched portions. For example, as shown in FIG. 1, each punched portion 2 of each steel sheet 1 includes a main portion 2a and an additional portion 2b extended from the main portion 2a toward the outer circumference of the rotor and inclined in the direction of either one of two sides of the rotor relative to the position of the main portion 2a such that each punched portion has an unsymmetrical configuration. The rotor core RC is composed of a plurality of units of the steel sheets $C_A$ and $C_B$ formed as described above. Two such units are shown in FIG. 2. In each unit, the additional portions 2b are inclined in the same direction. The main portions of both units are piled one upon another and the inclination of the additional portions of one unit is opposite to that of the other unit. For example, the steel sheets of the unit $C_A$ are laminated such that the additional portions 2a are inclined in the left and the main portions 2a are piled one upon another, as viewed in FIG. 2. The steel sheets of the unit $C_B$ are laminated such that the additional portions 2b are inclined in the right and that the main portions 2a are piled one upon another, as viewed in FIG. 2. Consequently, the main portions 2a of the steel sheets of both units provide slots 3 axially passing the rotor core RC. The unit $C_A$ is provided with a cavity defined by the additional portions 2b communicating to the slots 3 so as to be inclined in the left, as viewed in FIG. 2. The unit $C_B$ is provided with a cavity defined by the additional portions 2b communicating to the slots 3 so as to be inclined in the right, as viewed in FIG. 2. Furthermore, the slots 3 are parallel with an axis of the rotor and a distal end of each additional portion 2b is deviated from the center line 1 of each main portion 2a by a distance d satisfying the following expression (A) in the direction of the outer circumference of the rotor:

$$\frac{\pi D}{4(z + p)} \leq d \leq \frac{\pi D}{4(z - p)} \tag{A}$$

where
D = rotor diameter
z = the number of stator slots
p = the number of pole pairs With reference to FIG. 1(a), the number z of slots 3' of stator core RC' differs from the number of slots 3 of rotor core RC. A plurality of teeth 3a' between each stator slot 3' and its adjacent slot 3' correspond to one pole.

According to the above-described construction, the rotor bars may be easily press fitted in the respective slots 3 since the portion of the each slot 3 corresponding to the main portion 2a of each punched portion 2 is not inclined relative to the axis of the rotational shaft. Even where the rotor bars are formed by the aluminum casting or the like, the stepped portions are not formed on the inner surface of each slot 3 by the laminated steel sheets 1. Consequently, the occurrence of the defect such as the gas pocket may be reduced.

Based on the following principles, the same effect as obtained in the rotor with the skewed slots may be achieved in the rotor in accordance with the present invention and the occurrence of abnormal torque, vibration and noise with rotation of the rotor may be restrained.

First, the description is directed to the magnetic fluxes entering the rotor core RC via air-gap from the stator side. Suppose now that the flux $\phi$ is entering the one unit $C_A$ of the steel sheets of the rotor core RC from the stator side through a course shown by a solid line in FIG. 3. Since the additional portions 2b in the respective units $C_A$ and $C_B$ are inclined in directions opposite to each other, the course through which the magnetic flux enters the other unit $C_B$ at this time is shown by a broken line in FIG. 3. This means that since the magnetic flux $\phi$ is rotating relative to the rotor core RC, an electromotive force $e_A$ induced in the portion of one rotor bar positioned in the unit $C_A$ differs in phase from an electromotive force $e_B$ induced in the portion of the same rotor bar positioned in the unit $C_B$. The phase difference $\alpha$ (electrical angle) depends upon the distance 2d between the additional portions 2b of the respective units $C_A$ and $C_B$ and more specifically, the phase difference is obtained from the following expression based on a pole pitch $\tau$ presented by the number of pairs of poles p and outer diameter D of the laminated core 1:

$$\alpha = \frac{2d\pi}{\tau} \tag{1}$$

where $$\tau = \frac{\pi D}{2p}$$

On the other hand, each of the induced voltages $e_A$ and $e_B$ is represented as a vector quantity as shown in FIG. 3. The voltage e actually induced at the rotor bar 4 of the rotor is represented as the sum of the induced voltages, as $e = e_A + e_B$. The magnetic flux $\phi$ contains the harmonics and therefore, the induced voltages $e_A$ and $e_B$ also contain the harmonics. However, since the phase difference $\alpha$ is established between the induced voltages $e_A$ and $e_B$, the ratio of the harmonics contained in the composite voltage e differs in accordance with the orders of the harmonics.

The skew factor $K_{sn}$ representing the ratio of the harmonics contained in the induced voltage e is obtained from the following expression:

$$K_{sn} = \frac{e_A + e_B}{|e_A| + |e_B|} \tag{2}$$

Now, when it is assumed that the two units $C_A$, $C_B$ of the steel sheets have the same thickness, the equation, $|e_A| = |e_B|$ is held and the value of denominator in the expression (2) becomes equal to the length 2r which is twice as long as the line segment OA, as is conceptually shown by vector in FIG. 4. The vector sum in the numerator in the equation (2) becomes equal to the length q of a line segment OB in FIG. 4. Substituting the obtained values for the denominator and numerator respectively, $$K_{sn} = \frac{q}{2r} = \frac{2R \sin \alpha}{4R \sin(\alpha/2)} \tag{3}$$
$$= \cos(\alpha/2)$$

The phase angle $\alpha$ is increased by n times in the n-th harmonics. Substituting $n\alpha$ for $\alpha$, the skew factor $K_{sn}$ of the expression (2) is represented as follows:

$$K_{sn} = \cos(n\alpha/2) \tag{4}$$

It is generally known that the harmonics causing the abnormal torque, vibration or noise are produced by slot harmonics due to the slots of the stator. The order $\mu s$ of the slot harmonics is represented as follows:

$$\mu s = z/p \pm 1 \tag{5}$$

where z = the number of stator slots

Accordingly, the skew factor $K_{sn}$ in the degree shown by the expression (5) in the case of the present invention is obtained from the expression (4). That is, the range of the phase difference $\alpha$ relative to the range of the distance d set as in the expression (A) is obtained from the expression (1):

$$\frac{\pi p}{z + p} \leq \alpha \leq \frac{\pi p}{z - p} \tag{6}$$

Based on the result of the expression (6), the skew factor $K_{sn}$ in the first order (n = 1) is obtained as follows:
(a) at the lower limit of the phase difference $\alpha$:

$$K_{s1} = \cos(\alpha/2) \tag{7a}$$
$$= \cos\left[\frac{\pi p}{2(z + p)}\right]$$

(b) at the upper limit of the phase difference $\alpha$:

$$K_{s1} = \cos\left[\frac{\pi p}{2(z-p)}\right] \quad (7b)$$

Generally, since the number z of the stator slots is larger than that of the pole pairs p, for example, z=48 where p=2, the value of each of the expressions (7a) and (7b) approximates to 1.

On the other hand, the skew factor $K_{sn}$ due to the $\mu s$-th harmonics shown by the expression (5) is obtained at both lower and upper limits of the distance d as follows:

$$K_{sn} = \cos\left[\frac{\pi(z \pm p)}{2z}\right] \quad (8)$$

Considering the general case where the number z of the stator slots is larger than the number p of the pole pairs, as in the above-described case:

$$K_{sn} \approx \cos(\pi/2) = 0 \quad (9)$$

As a result, the skew factor $K_{sn}$ for the $\mu s$-th harmonics ill-affecting the rotor such as presented by the expression (5) may be approximated to zero. Accordingly, the skew factor $K_{sn}$ may be approximated to 1 for the primary components of the voltages induced in the rotor bars, the primary components effectively acting as torque. Furthermore, the induced voltages containing the $\mu s$-th harmonics causing the abnormal torque, vibration or noise may be reduced as much as possible, which produces the same effect as in the case where the rotor slots are skewed.

TABLE 1 shows the results of calculation of the skew factor introduced as described above, in accordance with various conditions. TABLE 1 also shows the values obtained in the case where the rotor slots are skewed conventionally and the skew factor $K_{sn}'$ in this conventional case is given by the following expression:

$$K_{sn}'' = \frac{\sin(n\alpha/2)}{n\alpha/2} \quad (10)$$

As understood from the following TABLE 1, the distance d in the range of the expression (A) takes the value as large as 0.6 or above when the rotor slots are skewed conventionally, while, in the present invention, the distance d takes the value of 0.1 or below or its approximate value, which shows that a sufficient skewing effect is obtained.

TABLE 1

| Distance d | | $\frac{\pi D}{4z}$ | | | $\frac{\pi D}{4(z+p)}$ | | | $\frac{\pi D}{4(z-p)}$ | | |
|---|---|---|---|---|---|---|---|---|---|---|
| Phase difference $\alpha$ | | $\frac{\pi}{z}$ p | | | $\frac{\pi}{(z/p)+1}$ | | | $\frac{\pi}{(z/p)-1}$ | | |
| Order n | | 1 | $\mu s^+$ | $\mu s^-$ | 1 | $\mu s^+$ | $\mu s^-$ | 1 | $\mu s^+$ | $\mu s^-$ |
| z = 48 | $K_{sn}$ | 0.998 | 0.065 | 0.065 | 0.998 | 0 | 0.125 | 0.998 | 0.136 | 0 |
| p = 2 | $K_{sn}''$ | 0.999 | 0.61 | 0.663 | 0.999 | 0.637 | 0.687 | 0.999 | 0.58 | 0.637 |
| z = 36 | $K_{sn}$ | 0.999 | 0.0436 | 0.0436 | 0.999 | 0 | 0.085 | 0.999 | 0.0896 | 0 |
| p = 1 | $K_{sn}''$ | 0.999 | 0.619 | 0.654 | 0.999 | 0.637 | 0.67 | 0.999 | 0.599 | 0.637 |
| z = 72 | $K_{sn}$ | 0.998 | 0.0654 | 0.0654 | 0.998 | 0 | 0.125 | 0.998 | 0.136 | 0 |
| p = 3 | $K_{sn}''$ | 0.999 | 0.609 | 0.663 | 0.999 | 0.637 | 0.687 | 0.999 | 0.58 | 0.637 |
| z = 48 | $K_{sn}$ | 0.999 | 0.0327 | 0.0327 | 0.999 | 0 | 0.064 | 0.999 | 0.067 | 0 |
| p = 1 | $K_{sn}''$ | 0.999 | 0.623 | 0.649 | 0.999 | 0.637 | 0.61 | 0.999 | 0.609 | 0.637 | where $K_{sn} = \cos\left(\frac{n\alpha}{2}\right)$, $K_{sn}'' = \frac{\sin\left(\frac{n\alpha}{2}\right)}{\left(\frac{n\alpha}{2}\right)}$ $$\mu_s^+ = \frac{z}{p} + 1, \quad \mu_s^- = \frac{z}{p} - 1$$

According to the present invention, the mechanical skewing may be used together in the above-described construction. FIG. 5 shows a conceptual construction for that purpose. The rotor core RC comprises two units $C_X$ and $C_Y$ of the steel sheets and each unit is composed by laminating a plurality of steel sheets each having the same configuration shown in FIG. 1. The main portions 2a of the steel sheets of both units are piled up one upon another and the additional portions 2b of one unit and those of the other unit are inclined in the directions opposite to each other relative to the center line of the main portion 2a. The main portions 2a of the steel sheets of both units provide the slots 3 formed through the rotor core RC. The additional portions 2b of the steel sheets of the unit $C_X$ provide the cavities communicating to the respective slots 3 and inclined in the left and those of the unit $C_Y$ provide the cavities communicating to the respective slots 3 and inclined in the right. Each unit is formed by laminating the steel sheets such that each slot 3 is skewed by a predetermined amount in the same direction and each slot of the rotor core RC is skewed by the distance g as a whole.

Based on the principles described below, the above-described construction achieves the skewing effect more than obtained by the conventional construction that each slot of the rotor core formed by laminating the steel sheets is skewed only by the distance d. Consequently, the abnormal torque, vibration or noise caused by driving the rotor may be restrained and furthermore, the position torque may also be reduced. More specifically, the above-described construction provides both the skewing effect obtained from the mechanical skewing (which effect will hereafter be referred to as "mechanical skewing effect") and the skewing effect by the configuration of the slots 3 as described above (which effect will hereafter be referred to as "magnetic skewing effect"), resulting in such a skewing effect as mentioned above.

Describing the principles, first, the magnetic skew factor $K_{sn}'$ is obtained and the mechanical skew factor $K_{sn}''$ is then obtained with reference to FIG. 6. The skew factor $K_{sn}$ as the sum of the magnetic skew factor $K_{sn}'$ and the mechanical skew factor $K_{sn}''$ is obtained and the skewing effect is described.

(A) magnetic skew factor $K_{sn}'$:

Since the magnetic skew factor $K_{sn}'$ results from the construction shown in FIG. 2, it is represented by the expression (4) as described above:

$$K_{sn}' = \cos(n\alpha/2) \tag{11}$$

(B) mechanical skew factor $K_{sn}''$:

FIG. 6 shows a rotor core formed of steel sheets each having slot-forming punched portions and the slots are skewed. The amount of skewing is represented by g. Since the skewing is mechanically performed, the phase of the magnetic flux changes on the center line 1 of the slot 5 depending upon the axial direction thereof. When the phase difference between both ends of the rotor core is represented by $\theta$ (electrical angle), it is represented with respect to the skewing amount g as follows:

$$\theta = \frac{g\pi}{\tau} \tag{12}$$

where $$\tau = \frac{\pi D}{2p}$$

The voltage e induced at the rotor bars is obtained from the vector diagram of FIG. 7. The induced voltage e is represented as the length of a chord OC as the result of composition of vectors the directions of which are in turn turned to form an arc S by the mechanical skewing. Where the length of the arc OC is s and the length of the chord OC is t, the skew factor $K_{sn}''$ is represented as follows:

$$K_s'' = \frac{t}{s} = \frac{2R'\sin\left(\frac{\theta}{2}\right)}{R'\theta} = \frac{\sin\left(\frac{\theta}{2}\right)}{\frac{\theta}{2}} \tag{13}$$

The phase angle $\theta$ is n-times as large in the case of the n-th harmonics. Substituting $n\theta$ for $\theta$, the skew factor $K_{sn}''$ shown by the expression (13) is represented as follows:

$$K_{sn}'' = \frac{\sin\left(\frac{n\theta}{2}\right)}{\frac{n\theta}{2}} \tag{14}$$

(C) skew factor $K_{sn}$ in the present invention:

The skew factor $K_{sn}$ may be represented as composition of the above-described two. Based on the vectors in FIGS. 4 and 7, the skew factor $K_{sn}$ is represented as follows:

$$K_s = \frac{t}{2r} = \frac{2R'\sin\left(\frac{\theta}{2}\right)}{4R\sin\left(\frac{\alpha}{2}\right)} = \frac{R'\sin\left(\frac{\theta}{2}\right)}{2R\sin\left(\frac{\alpha}{2}\right)} \tag{15}$$

As the same rotor core RC is considered, the length q of the line segment OB is equal to the length s of the arc OC and consequently, the following relationship holds:

$$R' = \frac{2R\sin\alpha}{\theta} \tag{16}$$

Accordingly, substituting the expression (16) for the expression (15), $$K_s = \frac{\frac{2R\sin\alpha}{\theta} \cdot \sin\left(\frac{\theta}{2}\right)}{2R\sin\left(\frac{\theta}{2}\right)} = \cos\left(\frac{\alpha}{2}\right) \cdot \frac{\sin\left(\frac{\theta}{2}\right)}{\left(\frac{\theta}{2}\right)} \tag{17}$$

Consequently, comparing the expressions (3) and (13), the skew factor $K_s$ in the present invention is represented as follows:

$$K_s = K_s' \cdot K_s'' \tag{18}$$

That is, the skew factor $K_s$ may be represented as the product of both of the skew factors.

Each of the phase angles $\alpha$ and $\theta$ is n times as large in the case of the n-th harmonics. Substituting the expression (16) for the expression (17) and comparing the expressions (11) and (14), the following expression is obtained:

$$K_{sn} = \cos\left(\frac{n\theta}{2}\right) \cdot \frac{\sin\left(\frac{n\theta}{2}\right)}{\frac{n\theta}{2}} = K_{sn}' \cdot K_{sn}'' \tag{19}$$

It is well known in the art that the harmonics tending to cause the abnormal torque, vibration or noise are the slot harmonics due to the stator slots. The order $\mu s$ of the slot harmonics is represented as follows:

$$\mu s = z/p \pm 1 \tag{5}$$

where z = the number of stator slots

Accordingly, the value of the skew factor $K_{sn}$ in the degree shown by the expression (20) in the present invention is obtained from the expression (19). More specifically, the range of the phase difference $\alpha$ with respect to the range (A) of the set distance d is obtained from the expression (1):

$$\frac{\pi p}{z + p} \leq \alpha \leq \frac{\pi p}{z - p} \tag{21}$$

Based on the result of the expression (21), the skew factor $K_{sn}$ in the first order (n=1) is obtained as follows:

(a) at the lower limit of the phase difference $\alpha$:

$$k_{s1} = \cos\left(\frac{\alpha}{2}\right) \cdot \frac{\sin\left(\frac{\theta}{2}\right)}{\frac{\theta}{2}} \quad (22a)$$

$$= \cos\left[\frac{\pi p}{2(z+p)}\right] \cdot \frac{\sin\left(\frac{\theta}{2}\right)}{\frac{\theta}{2}}$$

(b) at the upper limit of the phase difference $\alpha$:

$$K_{s1} = \cos\left[\frac{\pi p}{2(z-p)}\right] \cdot \frac{\sin\left(\frac{\theta}{2}\right)}{\frac{\theta}{2}} \quad (22b)$$

Since the number z of the stator slots is generally larger than that of the pole pairs p, for example, z=48 where p=2, the value of each cosine term of the expressions (22a) and (22b) approximates to 1. Further, since the value of $\theta$ is generally small, the values of the other terms approximate to 1. As a result, the value of each of the expressions (22a) and (22b) approximates to 1.

On the other hand, the skew factor $K_{sn}$ due to the $\mu$s-th harmonics shown by the expression (20) is obtained at both lower and upper limits of the distance d as follows:

$$K_{sn} = \cos\frac{\pi(z \pm p)}{2z} \cdot \frac{\sin\left(\mu s \cdot \frac{\theta}{2}\right)}{\mu s \cdot \frac{\theta}{2}} \quad (23)$$

Since the number z of the stator slots are usually larger than the number p of the pole pairs, the value of the cosine term of the expression (23) may be approximated to 0 as follows:

$$\cos\left[\frac{\pi(z \pm p)}{2z}\right] \approx \cos\left(\frac{\pi}{2}\right) = 0 \quad (24)$$

Accordingly, the value of the expression (24) representing the skew factor $K_{sn}$ with respect to the $\mu$s-th harmonics having a bad influence upon the rotor may be approximated to zero independently of the value of phase difference $\theta$ corresponding to the magnitude of the mechanical skewing. More specifically, the skew factor may be approximated to 1 with respect to the primary component of the voltage induced at the rotor bars, the primary component effectively acting as the rotational force of the rotor. Furthermore, the skew factor may be approximated to zero with respect to the $\mu$s-th harmonics causing the abnormal torque, vibration or noise.

The position torque caused depending upon the positions of the stator and rotor relative to each other at the starting will now be described.

First, substituting the mechanical skewing amount g and the phase differences $\alpha$, $\theta$ represented by the respective expressions (1) and (12) for the expression (19), the skew factor $K_{sn}$ is obtained:

$$K_{sn} = \cos\left(\frac{2npd}{D}\right) \cdot \frac{\sin\left(\frac{npd}{D}\right)}{\frac{npd}{D}} \quad (25)$$

Assuming that a skewing amount h is necessary when the conventional skewing is applied to the rotor core RC shown by FIG. 6 to reduce the position torque, as is shown by FIG. 8(a), a skewing amount g necessary to obtain the approximately same effect in the present invention is represented by FIG. 8(b) and the following relationship is obtained from the construction in FIG. 8(b):

$$g = h - 2d \quad (26)$$

More specifically, the necessary skewing amount in the present invention is smaller by 2d than in the case where only the mechanical skewing is applied to the rotor core RC. Now, consider the case where the construction shown in FIG. 8(a) necessitates a mechanical skewing amount h amounting to one pitch of the stator slots or above. For example, where $d = (\pi D)/(4z)$, the skewing amount g in the present invention is obtained:

$$g \geq \frac{\pi D}{2z} \quad (27)$$

TABLE 2 shows the values of the skew factor $K_{sn}$ introduced as described above, in accordance with various conditions. TABLE 2 also shows the values of the skew factor $K_{sn}'$ obtained based on the expression (11) in the case where only the magnetic skewing is applied to the rotor core and those of the skew factor $K_{sn}''$ obtained based on the expression (14) in the case where only the mechanical skewing is applied to the rotor core.

TABLE 2

| Distance d | $\frac{\pi D}{4z}$ | | | $\frac{\pi D}{4(z+p)}$ | | | $\frac{\pi D}{4(z-p)}$ | | |
|---|---|---|---|---|---|---|---|---|---|
| Phase difference $\alpha$ | $\frac{\pi}{z}p$ | | | $\frac{\pi}{(z/p)+1}$ | | | $\frac{\pi}{(z/p)-1}$ | | |
| Distance g | | | | $\frac{\pi D}{2z}$ | | | | | |
| Phase difference $\theta$ | | | | $\frac{\pi}{z}p$ | | | | | |
| Order n | 1 | $\mu s^+$ | $\mu s^-$ | 1 | $\mu s^+$ | $\mu s^-$ | 1 | $\mu s^+$ | $\mu s^-$ |
| (1) $K_{sn}$ | 0.997 | 0.040 | 0.043 | 0.997 | 0 | 0.083 | 0.997 | 0.083 | 0 |
| z = 48  $K_{sn}'$ | 0.998 | 0.065 | 0.065 | 0.998 | 0 | 0.125 | 0.998 | 0.136 | 0 |
| p = 2  $K_{sn}''$ | 0.999 | 0.610 | 0.663 | 0.999 | 0.610 | 0.663 | 0.999 | 0.610 | 0.663 |

TABLE 2-continued

| | | | | | | | | | | |
|---|---|---|---|---|---|---|---|---|---|---|
| (2) | $K_{sn}$ | 0.998 | 0.027 | 0.029 | 0.998 | 0 | 0.056 | 0.998 | 0.055 | 0 |
| z = 36 | $K_{sn}'$ | 0.999 | 0.0436 | 0.0436 | 0.999 | 0 | 0.085 | 0.999 | 0.0896 | 0 |
| p = 1 | $K_{sn}''$ | 0.999 | 0.619 | 0.654 | 0.999 | 0.619 | 0.654 | 0.999 | 0.619 | 0.654 |
| (3) | $K_{sn}$ | 0.997 | 0.040 | 0.043 | 0.997 | 0 | 0.083 | 0.997 | 0.083 | 0 |
| z = 72 | $K_{sn}'$ | 0.998 | 0.0654 | 0.0654 | 0.998 | 0 | 0.125 | 0.998 | 0.136 | 0 |
| p = 3 | $K_{sn}''$ | 0.999 | 0.609 | 0.663 | 0.999 | 0.609 | 0.663 | 0.999 | 0.609 | 0.663 |
| (4) | $K_{sn}$ | 0.998 | 0.020 | 0.021 | 0.998 | 0 | 0.042 | 0.998 | 0.042 | 0 |
| z = 48 | $K_{sn}'$ | 0.999 | 0.0327 | 0.0327 | 0.999 | 0 | 0.064 | 0.999 | 0.067 | 0 |
| p = 1 | $K_{sn}''$ | 0.999 | 0.623 | 0.649 | 0.999 | 0.623 | 0.649 | 0.999 | 0.623 | 0.649 | where $K_{sn} = \cos(n\alpha/2) \cdot \frac{\sin(n\theta/2)}{n\theta/2}$, $K_{sn}' = \cos(n\alpha/2)$, $K_{sn}'' = \frac{\sin(n\theta/2)}{n\theta/2}$ $$\mu_s^+ = \frac{z}{p} + 1, \mu_s^- = \frac{z}{p} - 1$$

As obvious from TABLE 2, The skew factor $K_{sn}''$ takes a value as large as 0.6 or above with the distance d in the range of the expression (A) when only the conventional mechanical skewing is applied to the slots, while the skew factor $K_{sn}'$ takes the value of 0.1 or below or its approximate value when only the magnetic skewing is applied to the slots. When both of the magnetic and mechanical skewings are applied to the slots, the skew factor $K_{sn}$ is reduced to the value 0.6 times as small as the value of the coefficient $K_{sn}'$, which shows that a sufficient skewing effect is achieved.

Other objects of the invention will become obvious upon understanding of the illustrative embodiments about to be described or will be indicated in the appended claims. Various advantages not referred to herein will occur to one skilled in the art upon employment of the invention in practice.

BRIEF DESCRIPTION OF THE DRAWINGS

FIG. 21 is a partially broken perspective view of the rotor core in a seventh embodiment;

FIG. 22 is a front view of the steel sheet composing the rotor core in an eighth embodiment;

FIG. 23 is a partial sectional view of the rotor core in the eighth embodiment;

DESCRIPTION OF THE PREFERRED EMBODIMENTS

Figure 9:
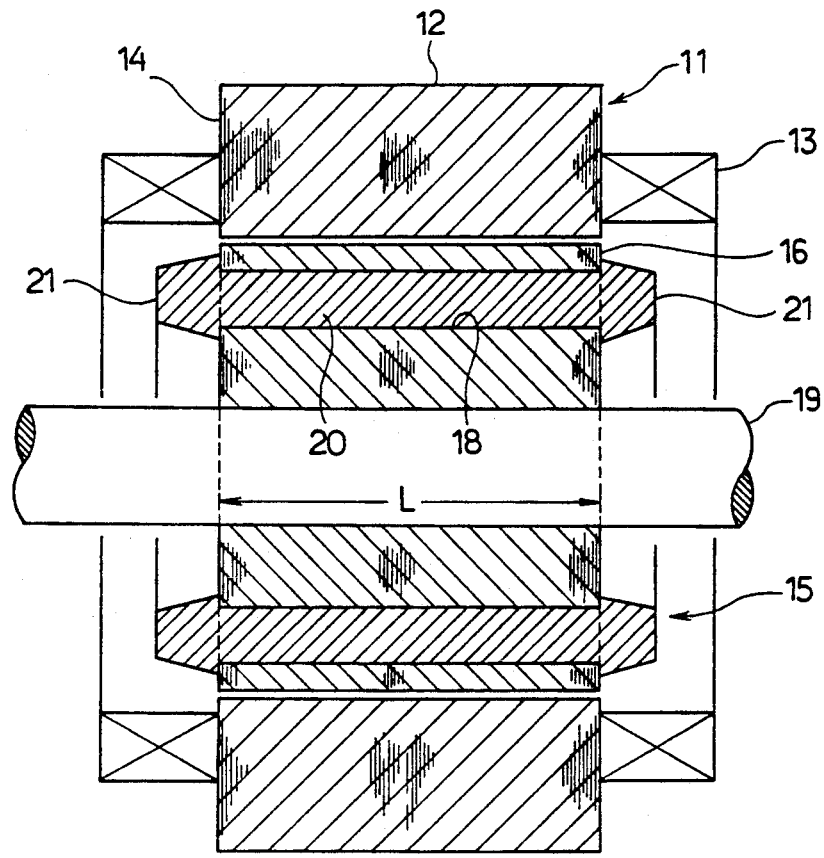
FIG. 9 is a longitudinal sectional view of a stator and rotor of an electric motor of a first embodiment.
Figure 10:
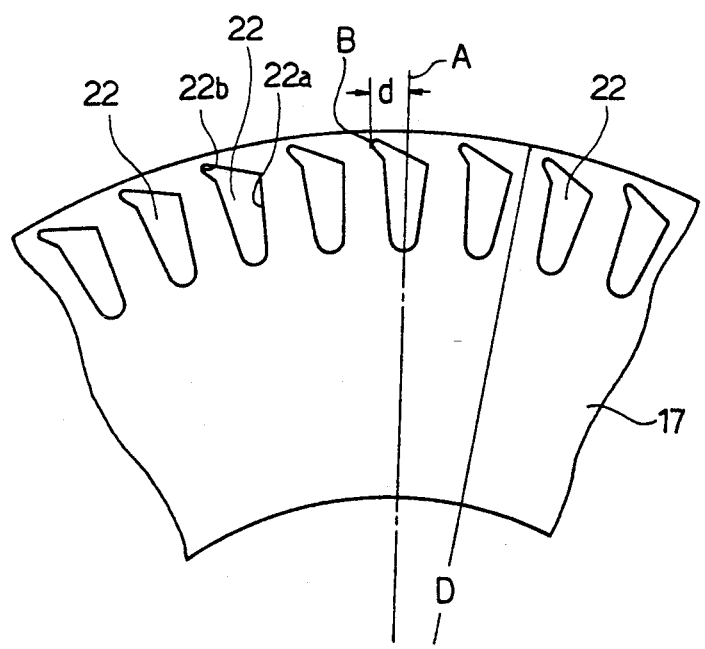
FIG. 10 is a front view of the steel sheet composing the rotor core of the motor in FIG. 9.
Figure 11:
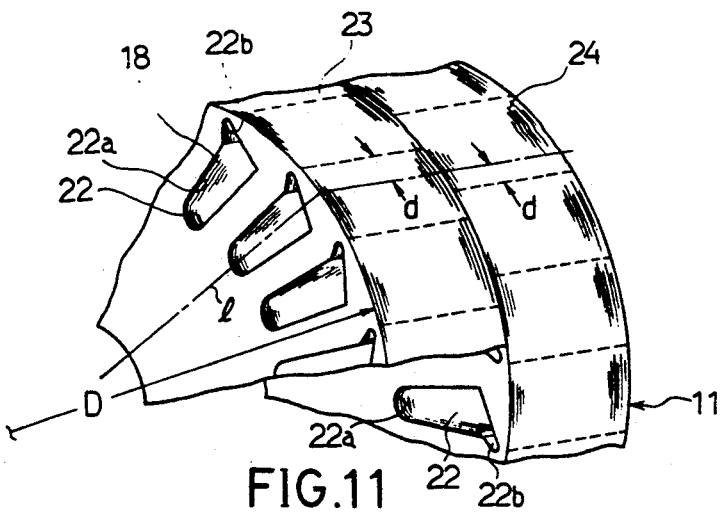
FIG. 11 is a partially broken perspective view of the rotor core of the motor in FIG. 9.
Figure 12:
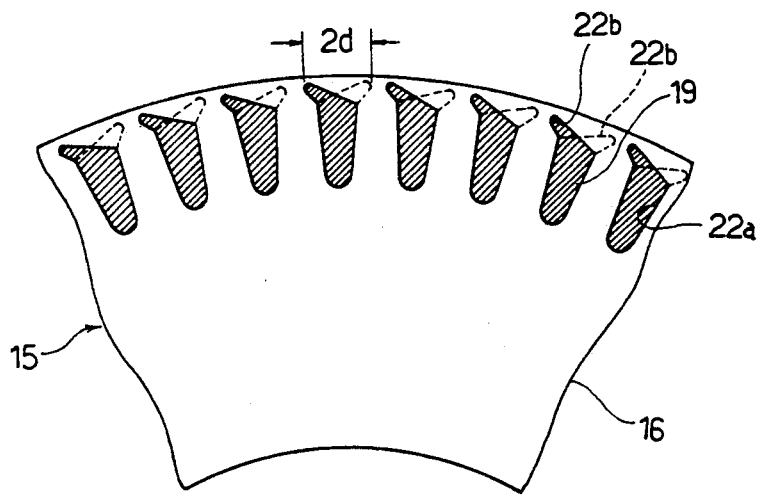
FIG. 12 is a sectional view of the rotor of the motor in FIG. 9.

A first embodiment of the present invention will be described with reference to FIGS. 9 to 13. Referring first to FIG. 9 illustrating the construction of a stator and rotor of an electric motor in section, a stator 11 comprises a stator core 12 and stator windings 13 embedded in stator slots (not shown). The stator core 12 is formed by laminating a number of steel sheets, each having slots formed by way of punching with the slots not skewed.

A squirrel-cage rotor 15 comprises a rotor core 16 formed by laminating a plurality of steel sheets 17, each having a configuration described later. Each steel sheet 17 has a large number of slots 18 formed along the outer circumference thereof such that the slots 18 axially pass through the rotor core 16. A rotational shaft 19 is fitted in a center hole of the rotor core 16. Rotor bars 20 are embedded in the respective slots 18 of the rotor core 16, for example, by way of aluminum casting. End rings 21 integral with the rotor bars 20 are provided at both ends of the rotor core 16, respectively.

Each of the steel sheets 17 composing the rotor core 16 is formed of a silicon steel sheet and has a circular configuration with an outer diameter D. A large number of punched portions 22 for forming the slots 18 are formed along the outer circumference thereof so as to be equally spaced. Each punched portion 22 comprises a main portion 22a and an additional portion 22b continuously extended from the main punched portion 22a toward the outer circumference of the rotor 15 and inclined toward one of two sides along the circumference of the rotor 15 relative to the position of the main portion 22a such that each punched portion 22 has an unsymmetrical configuration. A distal end B of the additional portion 22b is deviated by a distance d from the center A. The distance d is determined to take a value satisfying the expression (A):

$$d = (\pi D)/(4z) \tag{28}$$

A predetermined number of the steel sheets 17 are laminated such that the punched portions 22 are completely piled one upon another, that is, the punched portions 22 are not skewed. Thus, a first unit 23 of steel sheets 17 is composed so as to have the thickness half the whole thickness L of the rotor core 16. Furthermore, a second unit 24 comprises a predetermined number of the reversed steel sheets 17 such that the punched portions 22 are piled one upon another. The second unit 23 has the thickness half that of the whole thickness L of the rotor core 16. The steel sheets 17 composing the first unit 23 have the respective additional portions 22b inclined in one and the same direction and those of the steel sheets 17 composing the second unit 24 have the respective additional portions 22b inclined in one and the same direction. The steel sheets 17 of the second unit 24 are inclined in the direction opposite to that of the steel sheets 17 of the first unit 23 relative to the center A of the main portion 22a. The first and second units 23, 24 are integrated so that the main portions 22a of the steel sheets 17 composing both of the units 23, 24 are stacked, thereby composing the rotor core 16. Accordingly, when the rotor 15 is viewed axially of the rotational shaft 19, the slots 18 formed by the main portions 22a are extended over the whole length of the rotational shaft 19 in parallel therewith, and cavities formed by the additional portions 22b in the respective units are inclined in the directions opposite to each other. Additionally, the distal ends of the cavities formed by the additional portions 22b in the respective units are deviated by the distance 2d from each other.

According to the above-described construction, each slot 18 of the rotor core 16 extends straight through the rotor core 16 in parallel with the rotational shaft 19, each slot 18 has no stepped portions due to deviation of the steel sheets 17 on the inner surface of each slot 18. Consequently, where aluminum is cast into the slots 18 to form the rotor bars 20, occurrence of the defects such as the gas pockets due to the stepped portions may be prevented, which can prevent the weight distribution of the rotor 15 from being unbalanced.

Furthermore, the following skewing effect can be achieved in the state that the rotor is rotating. Since the distance d is determined by the expression (28) in the foregoing embodiment, the value of phase difference $\alpha$ represented by the expression (6) is obtained as follows:

$$\alpha = p\pi/z \tag{29}$$

Accordingly, the values of the skew factor $K_{sn}$ are obtained based on the expressions (7a), (7b) and (8):

(a) with respect to the primary harmonics (n=1):

$$K_{s1} = \cos\left(\frac{\pi p}{2z}\right) \tag{30}$$

(b) with respect to the $\mu$s-th harmonics ($\mu s = (z/p) \pm 1$):

$$K_{sn} = \left[\cos\frac{\pi}{2}\left(1 \pm \frac{p}{z}\right)\right] \tag{31}$$

TABLE 3 shows the values of the skew factor when the number z of the stator slots is 36 and the number p of the pole pairs is 2, for example.

TABLE 3

| Slot harmonics order (n) | $K_{sn}$ $\alpha = 0.1475$ Rad($=10$ deg) | $K_{sn}''$ | $\frac{K_{sn}}{K_{sn}''}$ |
| --- | --- | --- | --- |
| n = 1 | 0.996 | 0.999 | 0.997 |
| 5 | 0.906 | 0.969 | 0.935 |
| 7 | 0.819 | 0.939 | 0.872 |
| 11 | 0.574 | 0.854 | 0.672 |
| 13 | 0.423 | 0.799 | 0.529 |
| 17 | 0.987 | 0.672 | 0.129 |
| 19 | 0.087 | 0.601 | 0.145 |

Figure 13:
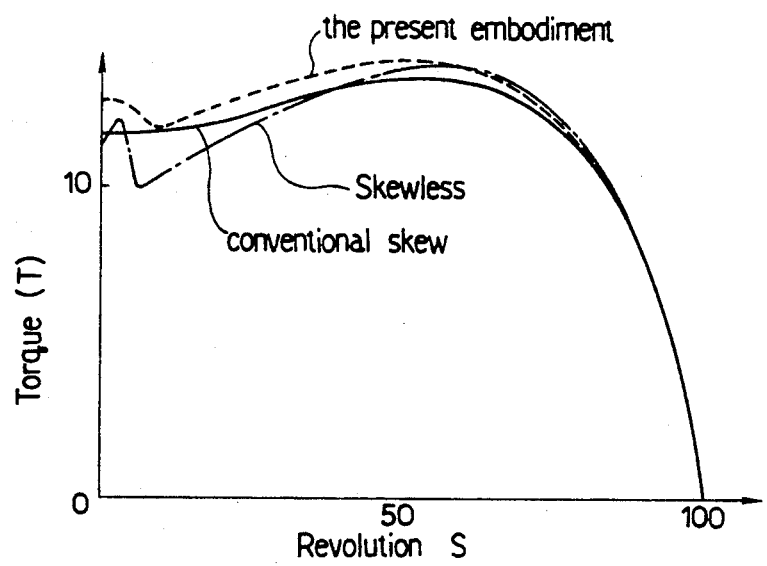
FIG. 13 is a graph showing the characteristic of the motor in FIG. 9.

As obvious from TABLE 3, the value of the skew factor $K_{sn}$ in the expression (30) is 0.996 and may be approximated to 1 and the values of the skew factor $K_{sn}$ in the expression (31) in the cases of the 17th and 19th harmonics are 0.087 and may be approximated to 0. In comparison of the skew factor $K_{sn}$ in the present invention with the conventional skew factor $K_{sn}''$, the values of the skew factor with respect to the 17th and 19th harmonics are reduced to those of 13% to 15% of the values of the conventional skew factor $K_{sn}''$. Accordingly, since the harmonic torque is reduced, the occurrence of the abnormal torque is restrained and the vibration and noise are reduced. FIG. 13 shows the relationship between the speed of a motor employing the squirrel-cage rotor of the embodiment and the torque thereof. The solid line represents the characteristic of the motor employing the squirrel-cage rotor of the embodiment and the broken line represents the characteristic of a motor employing the conventional rotor with skewed slots. An alternate long and short dash line represents the characteristics of a motor employing a conventional rotor with skewless slots. As obvious from FIG. 13, the torque is reduced immediately after starting in the case of the conventional motor with the skewless rotor slots and the abnormal torque is caused. On the other hand, in the motor with the squirrel-cage rotor of the embodiment, reduction of the harmonic torque improves the torque reduction and the skewing effect is higher than in the conventional motor with the skewed rotor slots. This means that the motor is started smoothly as compared with the conventional motors and the motor reaches the rated revolution in a short period.

Although the rotor bars 20 are embedded in the slots 18 by way of aluminum casting in the foregoing embodiment, conductor bars may be force fitted in the slots 18 to be used as rotor bars. When such force fitted rotor bars are formed, too, the slots 18 are extended straight through the rotor core in parallel with the rotational shaft 19. Consequently, the conductor bars may be force fitted with ease. Furthermore, although the slots 18 are of the closed type in the foregoing embodiment, the slots may be of the half-closed type wherein the openings are formed so as to be axially extended on the circumferential surface of the rotor core 16. Furthermore, although the value of the distance d is determined by the expression (28) in the foregoing embodiment, it may be in the range of the expression (A).

Figure 14:
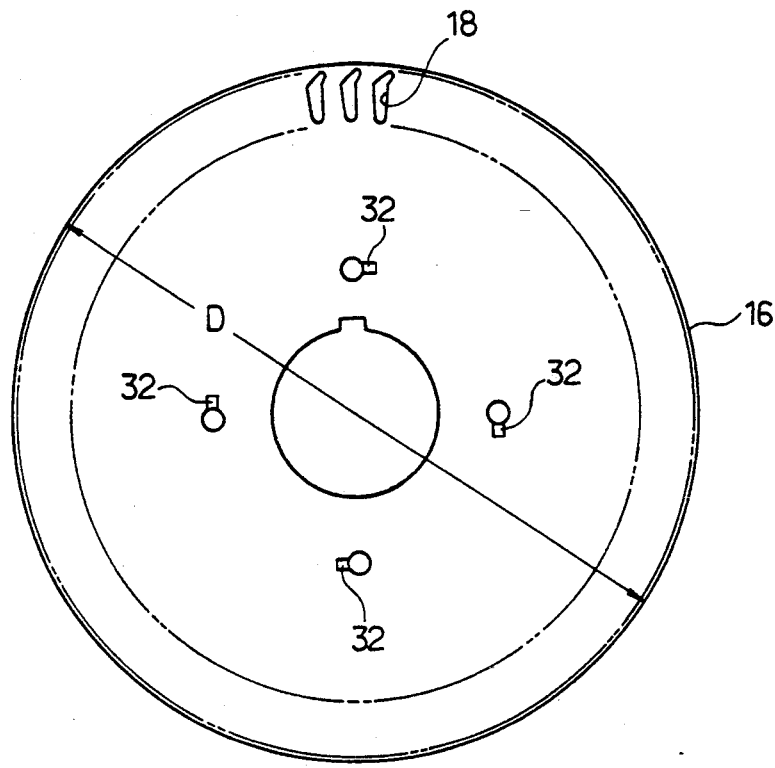
FIG. 14 is a front view of the steel sheet composing the rotor core of the rotor of a second embodiment.
Figure 15:
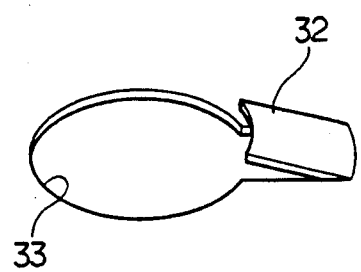
FIG. 15 is an enlarged perspective view of projections of the steel sheet in the second embodiment.
Figure 16:
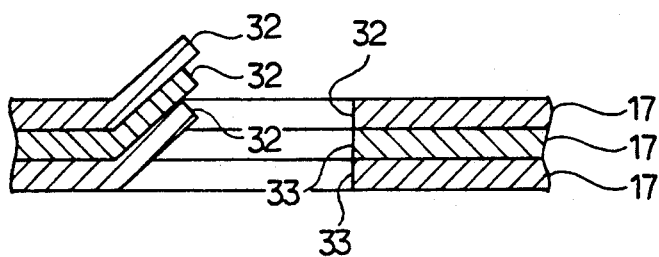
FIG. 16 is an enlarged sectional view of the steel sheets laminated in the second embodiment.

FIGS. 14 to 16 illustrate a second embodiment of the invention. The configuration of the steel sheets composing the rotor core in the second embodiment differs from that in the previous embodiment. Each steel sheet 31 has four projections 32 formed a little to the inner circumference as shown in FIG. 14. As shown in FIG. 15, each projection 32 is formed by cutting and raising a part of an open edge of each circular opening 33 and is angularly spaced by 90 degrees from the adjacent one. In the state that the steel sheets 31 are laminated, the projections 32 of the lower steel sheet 31 is fitted in recesses formed by the projections 32 of the upper steel sheet 31, respectively such that the upper and lower steel sheets are positioned, as shown in FIG. 16. In the state that the steel sheets 31 are thus positioned, the punched portions 22 of each steel sheet 31 lie in a row such that the slots 18 extends straight through the rotor core, 16 in parallel with the shaft 19. One unit is formed into a unit of the steel sheets 31 laminated as described above and the other unit is composed into a unit of steel sheets 31 each having the additional portions 22b inclined in the direction opposite to that of the additional portions 22b in the one unit. These units are integrated to compose the rotor core as in the foregoing embodiment.

In accordance with the second embodiment, the steel sheets 31 may be positioned when they are laminated. Accordingly, a specific jig or technique is not necessitated for positioning the steel sheets 31. Furthermore, when the skewing is conventionally applied to the slots of the steel sheets in which the projections for connecting the steel sheets to one another are formed by pressing, the positions of the projections need to be slightly deviated from one steel sheet to another. A complicated punching template is used for that purpose and an apparatus is used for rotating the punching template every time one template is punched out. However, since the skewing is not necessary in the embodiment, the positions of the projections 32 need not be deviated relative to the steel sheets 31. Consequently, a press for punching the steel sheets 31 and a punching template may each have a simple construction, which reduces the production cost.

Figure 1:
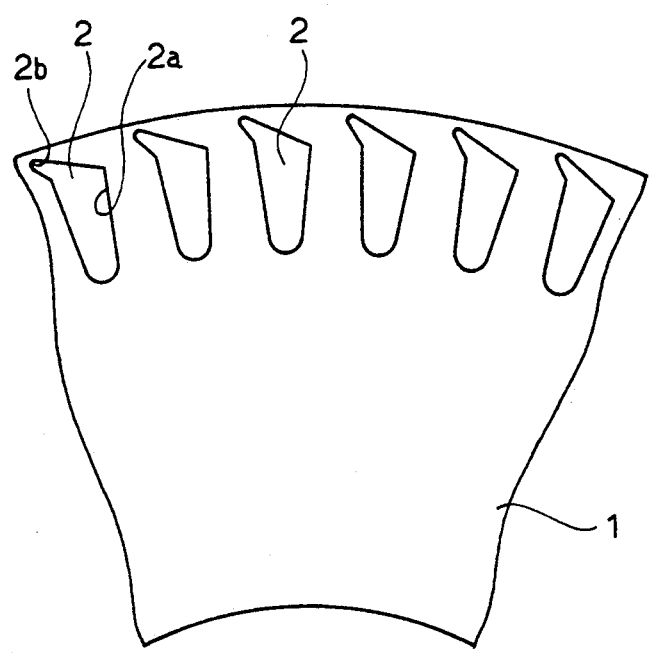
FIG. 1 is a plan view of a steel sheet employed in a rotor core of a squirrel-cage rotor in accordance with the present invention.
Figure 2:
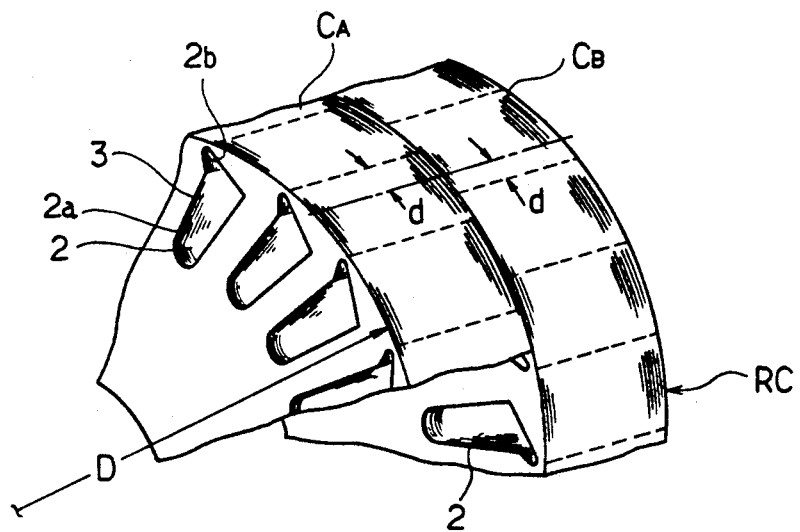
FIG. 2 is a partially broken perspective view of the rotor core.
Figure 1A:
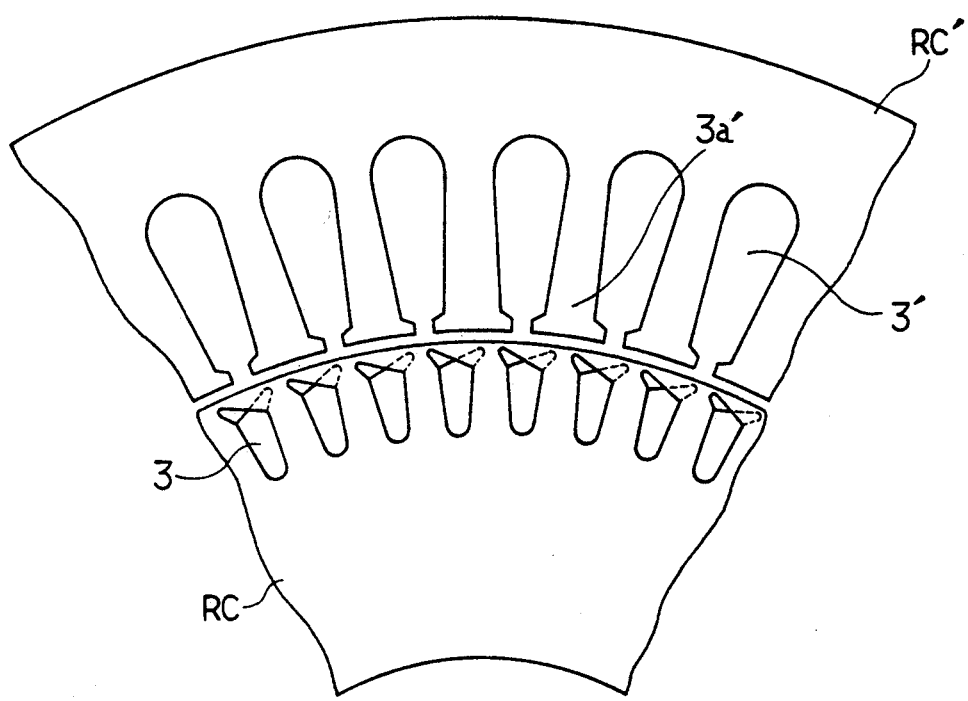
FIG. 1(a) is a partially cut-out side view of a stator core and a rotor core.
Figure 3:
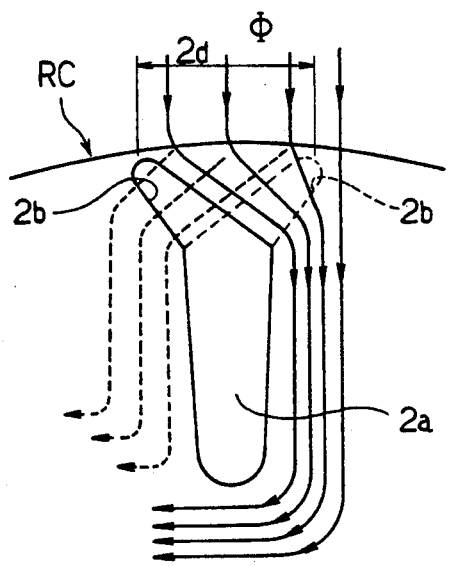
FIG. 3 shows the magnetic flux distribution in the rotor core for explanation of the operation of the rotor.
Figure 4:
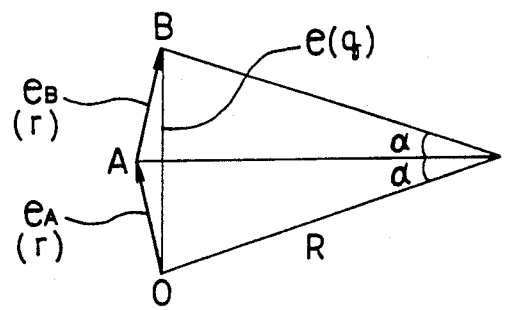
FIG. 4 is a vector diagram representing electromotive forces induced at the rotor bars.
Figure 5:
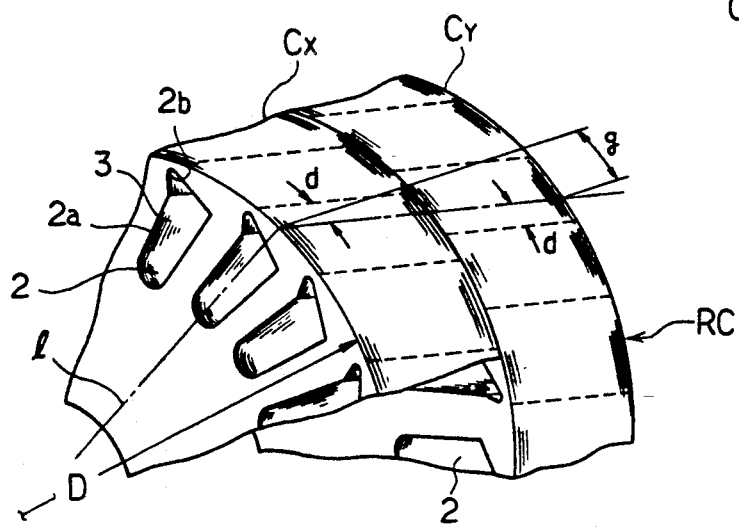
FIG. 5 is a perspective view of the rotor core to which the mechanical skewing is applied together, in accordance with the present invention.
Figure 6:
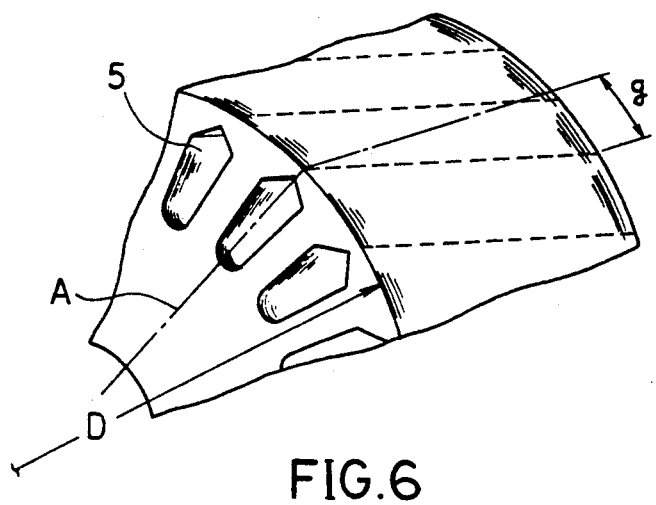
FIG. 6 is a perspective view of the rotor core to which only the mechanical skewing is applied; r FIG. 7 i s a vector diagram representing the electromotive forces induced at the rotor bars in the case where the mechanical skewing is applied to the rotor core.
Figure 7:
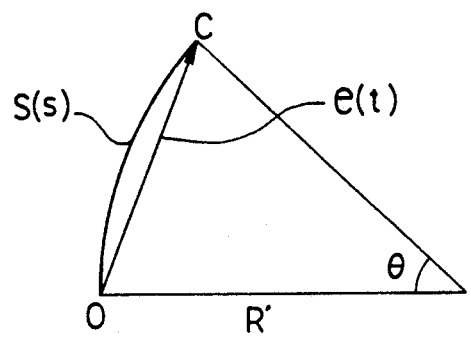
Figure 8:
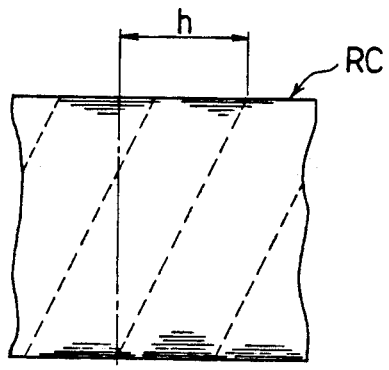
FIGS. 8(a) and 8(b) are side views of rotor core for explanation of the effect of the reduction of the position torque.
Figure 8:
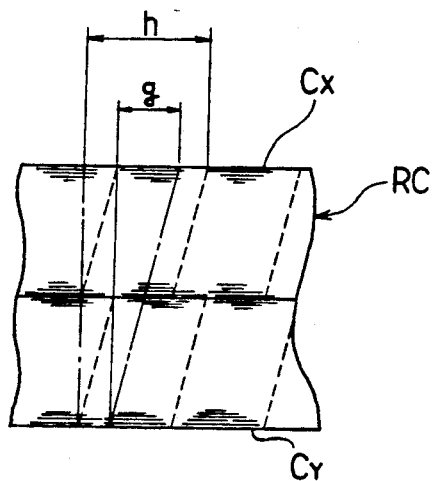
Figure 17:
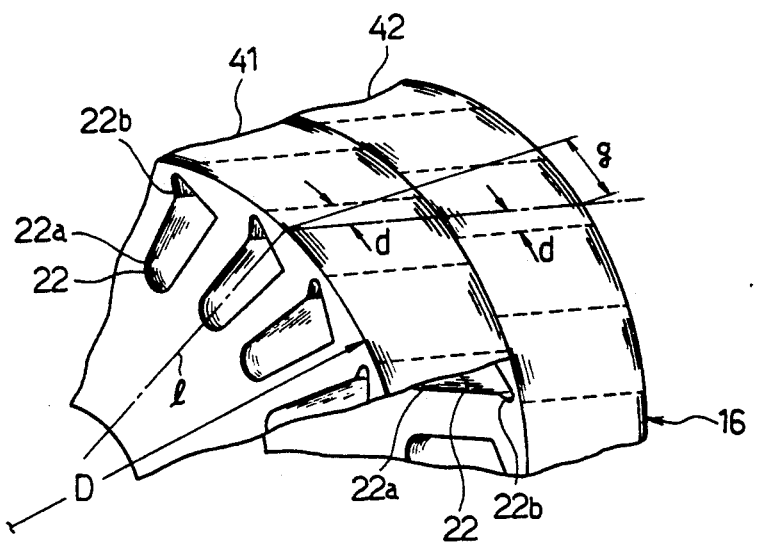
FIG. 17 is a partially broken perspective view of the rotor core in a third embodiment.

FIG. 17 shows a third embodiment. The steel sheets 31 each have the same configuration as those employed in the first embodiment but the skewing is applied to the slots of the steel sheets when they are laminated. The manner of laminating the steel sheets 31 is described with reference to FIG. 17. A first unit 41 is formed by laminating a preselected number of the steel sheets 17 such that the positions of the punched portions 22 are slightly deviated circumferentially. The first unit 41 has the thickness half the thickness L of the whole rotor core 16. As a result, skewed slots 18 inclined relative to the shaft 19 are formed. An amount of skewing in the first unit 41 is determined so that the positions of the steel sheets 17 are circumferentially deviated by g/2 at both ends of the unit 41. A second unit is formed by laminating the steel sheets 17 so that the additional portions 22b are inclined in the direction opposite to that in the first unit 41 by reversing the steel sheets 17, and so that the thickness of the lamination is half the thickness of the rotor core. The skewed slots 18 having the skewing amount of g/2 are thus formed. The first and second units 41, 42 are integrated so that the main portions 22a of the punched portions 22 in both units are piled one upon another, thereby composing one rotor core as shown in FIG. 7. Consequently, each slot 18 of the rotor core 16 is skewed by the distance g as a whole.

In accordance with the above-described construction, the following skewing effect is achieved in the state that the rotor is rotating. Since an amount of deviation between the center L of each main portion 22a and a distal end T of (28), the value of the phase difference α is obtained based on the expression (1):

$$\alpha = \frac{\pi p}{z} \quad (32)$$

Accordingly, the values of the skew factor $K_{sn}$ are obtained based on the expressions (22), (22b) and (23) as follows:

(a) with respect to the primary harmonics (n=1):

$$K_{s1} = \cos\left(\frac{\pi p}{2z}\right) \cdot \frac{\sin\left(\frac{pg}{D}\right)}{\frac{pg}{D}} \quad (33)$$

(b) with respect to the μs-th harmonics (μs=(z/p)±1):

$$K_{sn} = \cos\left[\frac{\pi}{2}\left(1 \pm \frac{p}{z}\right)\right] \cdot \frac{\sin\left[\frac{g(z \pm p)}{D}\right]}{\frac{g(z \pm p)}{D}} \quad (34)$$

TABLE 4 shows the values of the skew factor when the number z of the stator slots is 36, the number p of the pole pairs is 2, and the amount g of skewing is one pitch of the stator slot (g=πD/z). Consequently, the value of the skew factor $K_{sn}$ in the expression (33) is 0.995 and may be approximated to 1 and the values of the skew factor $K_{sn}$ in the expression (34) in the cases of the 17th and 19th harmonics are 0.058 and 0.052 respectively and may each be approximated to 0.

TABLE 4

| Slot harmonics order (n) | $K_{sn}$<br>α = 0.1745 Rad(=10 deg)<br>θ = 0.1745 Rad<br>(=10 deg) | $K_{sn}'$<br>—<br>—<br>— | $K_{sn}''$<br>—<br>θ = 0.1745 Rad<br>(=10 deg) | $\frac{K_{sn}}{K_{sn}'}$ | $\frac{K_{sn}}{K_{sn}''}$ |
|---|---|---|---|---|---|
| n = 1 | 0.995 | 0.996 | 0.999 | 0.999 | 0.996 |
| 5 | 0.878 | 0.906 | 0.969 | 0.969 | 0.906 |
| 7 | 0.769 | 0.819 | 0.939 | 0.939 | 0.819 |
| 11 | 0.490 | 0.574 | 0.854 | 0.854 | 0.574 |
| 13 | 0.338 | 0.423 | 0.799 | 0.799 | 0.423 |

TABLE 4-continued

| Slot harmonics order (n) | $K_{sn}$ $\alpha = 0.1745$ Rad($=10$ deg) $\theta = 0.1745$ Rad ($=10$ deg) | $K_{sn}'$ — — | $K_{sn}''$ $\theta = 0.1745$ Rad ($=10$ deg) | $\dfrac{K_{sn}}{K_{sn}'}$ | $\dfrac{K_{sn}}{K_{sn}''}$ |
|---|---|---|---|---|---|
| 17 | 0.058 | 0.087 | 0.672 | 0.672 | 0.087 |
| 19 | 0.052 | 0.087 | 0.601 | 0.601 | 0.087 |

In comparison of the skew factor $K_{sn}$ in the present invention with the magnetic skew factor $K_{sn}'$ in the case where the magnetic skewing is applied to the rotor slots and the conventional skew factor $K_{sn}''$, the values of the skew factor with respect to the 17th and 19th slot harmonics are reduced to those of 9% of the values of the conventional skew factor $K_{sn}''$. Those values in the present invention are reduced to the values of about 60% in the magnetic skew factor $K_{sn}''$. Accordingly, since the harmonic torque is reduced, the occurrence of the abnormal torque is restrained and the vibration and noise are reduced.

Concerning the position torque caused depending upon the relationship of the positions of the stator 11 and rotor 15 relative to each other at starting, too, it is largely reduced in the present invention, as compared with the conventional motor in which the mechanical skewing is applied to the rotor slots. More specifically, the amount h of skewing substantially acting as the skewing effect in the present invention is obtained by substituting the expression (28) and the value of g for the expression (26):

$$h = g + 2d = \frac{\pi D}{z} + 2 \cdot \frac{\pi D}{4z} = \frac{3}{2} g \qquad (35)$$

Consequently, although the actual amount of mechanical skewing is g, the skewing effect obtained in the present invention is the same as in the case where the mechanical skewing is applied to the rotor with the skewing amount of 1.5 g. The position torque is thus restrained sufficiently with smaller amount of the mechanical skewing. Since this means that the effective sectional area of each slot 18 of the rotor 15 may be increased with sufficient skewing effect obtained, reduction of the rotational characteristic and abnormal temperature increase of the motor may be restrained.

Figure 18:
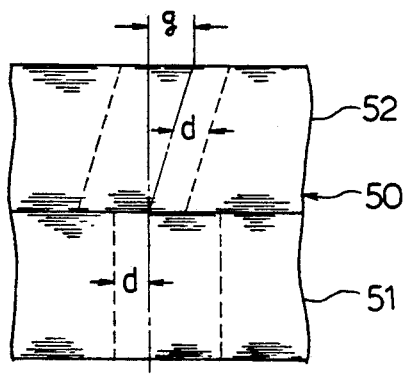
FIG. 18 is a side view of the rotor core in a fourth embodiment.

FIG. 18 illustrates a fourth embodiment. The magnetic skewing is applied to the slots formed in the laminated steel sheets composing both units 51 and 52 of the rotor core 50. Furthermore, the mechanical skewing, the amount of which is g, is applied to the slots of the unit 52.

Figure 19:
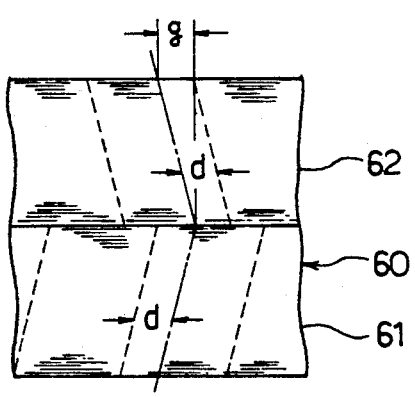
FIG. 19 is a side view of the rotor core in a fifth embodiment.

FIG. 19 illustrates a fifth embodiment. The magnetic skewing is applied to the slots of each of the units 61, 62 composing the rotor core 60 and the mechanical skewing in the opposite direction is applied to the slots of each unit by the amount g.

Figure 20:
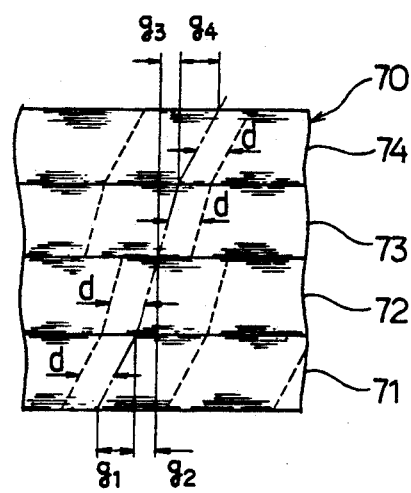
FIG. 20 is a side view of the rotor core in a sixth embodiment.

FIG. 20 illustrates a sixth embodiment. The rotor core 70 is composed of four units 71 to 74. The steel sheets are laminated such that the additional portions of the steel sheets composing the unit 71 positioned at one end side of the rotor core and its adjacent unit 72 are inclined in the direction opposite to that of the additional portions of the steel sheets composing the unit 74 positioned at the other end side of the rotor core and its adjacent unit 73 with the main portions piled one upon another. The magnetic skewing is applied to the slots of each of the units 71–74 in the same direction and the amount of skewing is g1 to g4.

FIG. 21 illustrates a seventh embodiment. In this embodiment, the construction of the third embodiment in which both of the magnetic skewing and mechanical skewing are used together is combined with the construction of the second embodiment in which the positioning projections are formed on each steel sheet More specifically, each of the steel sheets 31 composing the rotor core 80 has four projections 32 formed a little to the inner circumference as shown in FIG. 14. As shown in FIG. 15, each projection 32 is formed by cutting and raising a part of an open edge of each circular opening 33 and is angularly spaced by 90 degrees from the adjacent one. The projections 32 are diametrically deviated slightly from sheet to sheet relative to the punched portions 22. Accordingly, when the steel sheets 31 are laminated, the skewed slots inclined axially of the rotor core 80 are formed. One unit is composed into a unit of the steel sheets 31 laminated as described above and the other unit is composed into a unit of steel sheets 31, each having the additional portions 22b inclined in the direction opposite to that of the additional portions 22b in the one unit. These units are integrated to compose the rotor core 80 as in the second embodiment.

FIGS. 22 and 23 illustrates an eighth embodiment. The configuration of steel sheets 90 employed in the eighth embodiment is shown in FIG. 22. Each punched portion 91 comprises a main portion 91a composing the deep slot and an additional portion 91b continuously extended from the main punched portion 91a toward the outer circumference of the rotor and inclined toward one of two sides along the circumference of the rotor 15 relative to the position of the main portion 91a such that each punched portion 91 has an unsymmetrical configuration. Each additional portion 91a is provided with a shoulder portion 91c opposed to the distal end of the adjacent additional portion 91a. An interval between one punched portion 91 and the adjacent one is approximately uniform from the inner circumferential side to the outer circumferential side of the rotor core. Accordingly, where the distance between one punched portion and the adjacent one is represented by k, the distance s' between the additional portions 91b in the embodiment is longer than the shortest distance s at the outer circumferential side in the case where the shoulder portion 91c is absent and approximately the same as the distance k.

Figure 24:
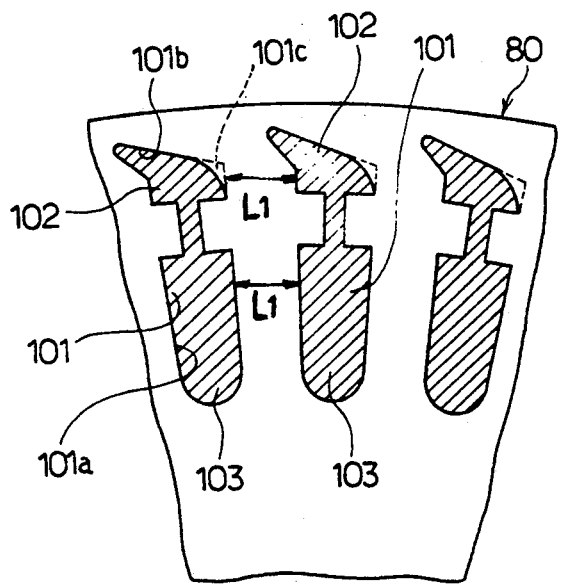
FIG. 24 is a partial sectional view of a stator and rotor of a motor in a ninth embodiment.
Figure 25:
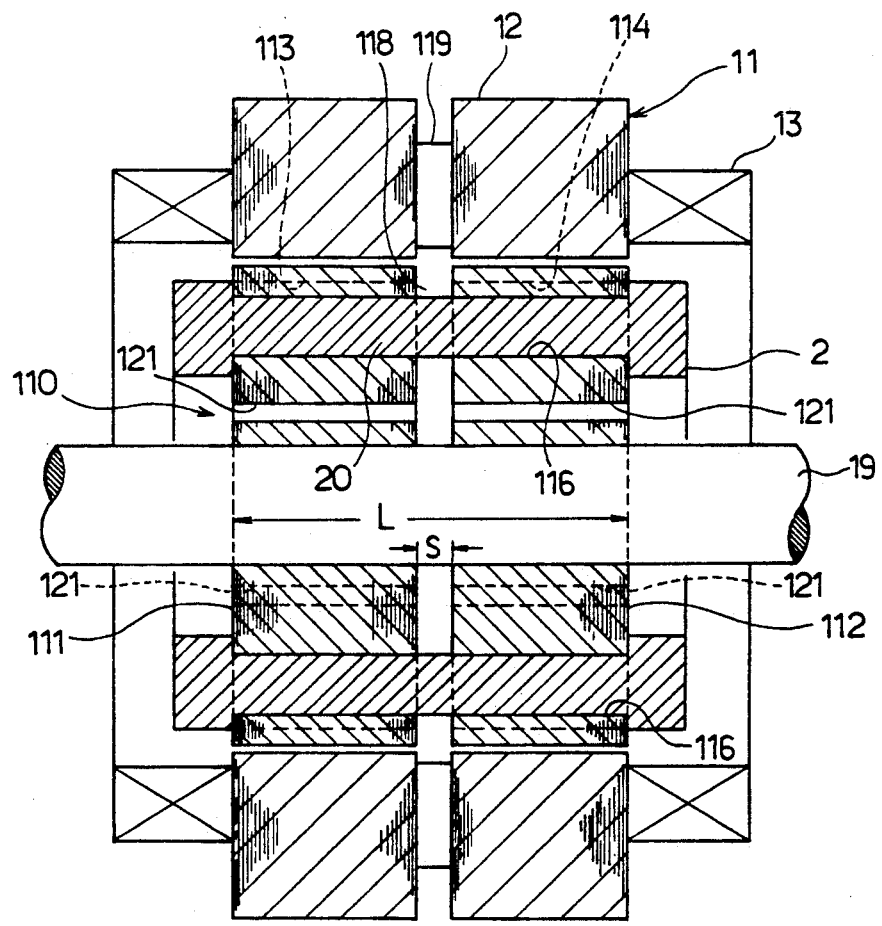
FIG. 25 is a longitudinal sectional view of a stator and rotor of the motor of a tenth embodiment.

In accordance with the above-described construction, the magnetic fluxes $\phi$ entering the rotor core do not concentrate upon specific slots and an approximately uniform flux density may be held. More specifically, where each punched portion 91 is not provided with the shoulder portion 91c, the above-mentioned shortest distance s is shorter than the distance k between the slots for design convenience. As a result, the flux density is increased at the portion of the shortest distance and the rotor core is overheated at this portion or the characteristics of the rotor core is degraded. To prevent such drawbacks, conventionally, the interval between the slots are increased or the rotor core is rendered large-sized so that the necessary flux density is obtained. However, in the embodiment, provision of the shoulder portions 91c can prevent the concentration of the magnetic fluxes and the above-described drawbacks may be overcome. Consequently, the rotor core may be rendered small in size and light in weight FIG. 24 illustrates a ninth embodiment. The construction of the rotor core in the ninth embodiment differs from that in the eighth embodiment in that the slots are of the double squirrel-cage type. Each additional portion 101b is provided with a shoulder portion 101c opposed to the distal end of the adjacent additional portion 101b. An interval L, between a portion 102 of the punched portion 101 forming an outer squirrel-cage and the adjacent portion 102 is approximately the same as that between a portion 103 of the punched portion 101 forming an inner squirrel-cage.

FIGS. 25 to 28 illustrate a tenth embodiment. The configuration of each steel sheet employed in the tenth embodiment is the same as that in the first embodiment. The steel sheets are laminated such that first and second units 111 and 112 having the directions of inclination of the additional portions opposite to each other. In the units 111 and 112, the punched portions of the laminated steel cores provides rotor core cooling ducts 121 axially extended. The ducts 121 are circumferentially spaced. The rotor bars 20 are embedded in the slots 116 formed by the main portions 22a of the laminated steel sheets. Two rotor bar cooling ducts 113 and 114 are formed by the additional portions 22b of the laminated steel sheets. The positions of the ducts 113, 114 are circumferentially deviated from each other. A predetermined gap 118 is provided between the units 111 and 112. The gap 118 communicates between the rotor bar cooling ducts 113, 114 of the respective units axially of the rotor The stator core 11 is provided with an intermediate spacer 119. The axial length of the spacer is equal to that of the rotor core 110.

Figure 26:
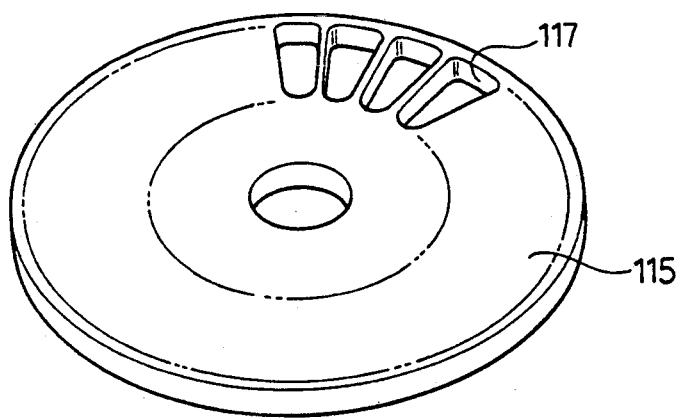
FIG. 26 is a perspective view of a duct forming piece in the tenth embodiment.
Figure 27:
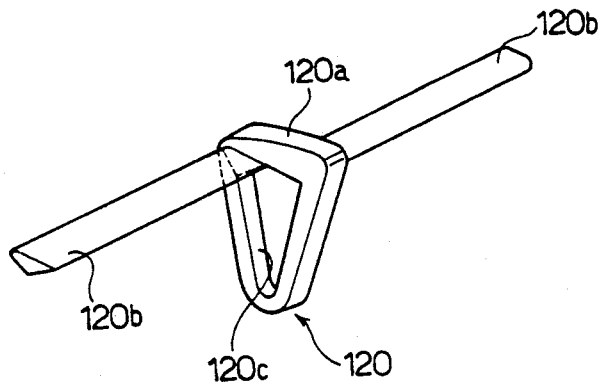
FIG. 27 is a perspective view of a core employed in the motor of the tenth embodiment.
Figure 28:
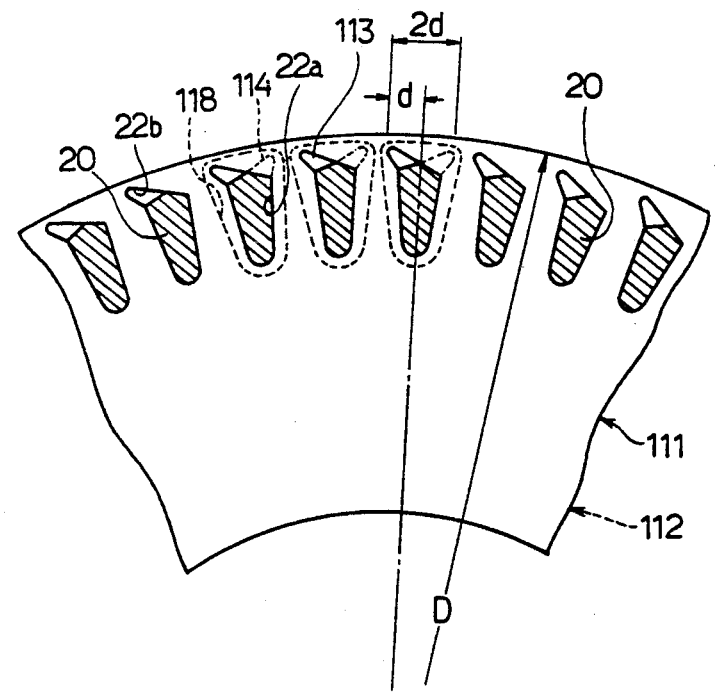
FIG. 28 is a partial sectional view of the rotor in the tenth embodiment.

The rotor core 110 having the above-described construction is made in the following method. Prior to the casting of the rotor bars 20, the units 111, 112 are integrated with the spacer 115 interposed therebetween. The spacer 115 is formed from a water-soluble material or any alloy having the melting point lower than an alloy forming the rotor bars 20. Through-holes 117 are formed in the outer circumference of the rotor core 110 so as to correspond to the respective slots 116, as shown in FIG. 26. The opening of each hole 117 is larger than that of each punched portion 22. Before the units 111, 112 and the spacer 115 are integrated, core members 120 also formed from the water-soluble material or any alloy having the melting point lower than the alloy forming the rotor bars 20 are previously inserted in the respective slots 116 of the units 111, 112 and the through-holes 117 of the spacer 115. As shown in FIG. 27, each core member 120 comprises a main portion 120a fitted in the through-holes 117 of the spacer 115 and two rotor core cooling duct forming portion 120b inserted in the cavities formed by the additional portions 22b. Each core member 120 has in the main portion 120a a molten metal feed opening 120c having the diameter same as each rotor bar 20. The rotor core 110 to which the core members 120 are attached is put into a die. Then, a suitable amount of molten metal is supplied into the die and the rotor bars 20 and end rings 21 are integrally formed by die casting. The spacer 115 and the core members 120 are dissolved in water or heated after the die casting, thereby removing the spacer 115 and the core members 120. In the case where the spacer 115 and the core members 120 are made of the alloy having the melting point lower than the rotor bars 20, it is preferable that a slot insulating paint or the like be applied on the surface of each core 120 and the surface of the spacer 115 to provide a heat-proof coating. Consequently, the cores 120 may be thermally protected from the molten metal and prevented from being melted during the casting.

In accordance with the above-described embodiment, the rotor bar cooling ducts 113, 114 and the rotor core cooling ducts 121 are formed in each unit 111, 112 and the gap 118 is provided between the units. Accordingly, both ends of each rotor bar cooling duct 113, 114 are open. Consequently, since an exterior air flows into each rotor bar cooling duct 113, 114 as well as the rotor core cooling duct 121, axially flowing, the heat may be efficiently radiated from the rotor bars 20 and the rotor core 110.

Although the rotor bars 20 are embedded in the slots of the rotor core by way of the die casting in the foregoing embodiment, they may be force fitted in the slots. Furthermore, the spacer 115 and the core members 120 may be integrated as one part. 115 may be at the outer circumferential side of the rotor.

The foregoing disclosure and drawings are merely illustrative of the principles of the present invention and are not to be interpreted in a limiting sense. The only limitation is to be determined from the scope of the appended claims.

We claim:

1. A squirrel-cage rotor for use in a motor of the slotted stator core type comprising:
   a) a rotor core comprising one or a plurality of first units of steel sheets and one or a plurality of second units of steel sheets, each unit being composed of a plurality of steel sheets each having a number of slot-forming punched portions for forming slots, the number of which differs from the number of slots of a stator core, each punched portion including a main portion and an additional portion extended from the main portion toward the outer circumference of the rotor and inclined in the direction of either one of two sides along the circumference of the rotor relative to the position of the main portion such that each punched portion has any unsymmetrical configuration, each main portion having the center deviated from a distal end of each additional portion by a distance d satisfying the following expression (A) circumferentially of the rotor:

$$\frac{\pi D}{4(z + p)} \leq d \leq \frac{\pi D}{4(z - p)} \tag{A}$$

where
D = rotor diameter
z = the number of stator slots
p = the number of pole pairs
each first unit being composed of the steel sheets laminated so that the respective additional portions are inclined in the direction of the one side along the circumference of the rotor relative to the positions of the respective main portions and so that the main portions are piled on upon another, each second unit being composed of the steel sheets laminated so that the respective additional portions are inclined in the direction of the other side along the circumference of the rotor relative to the positions of the respective main portions and so that the main portions are piled one upon another;

b) rotor bars embedded in slots of the rotor core formed by the punched portions of the steel sheets laminated, respectively; and c) end rings provided for short-circuiting the rotor bars at both ends of the rotor core, respectively.

2. A squirrel-cage rotor comprising:

a) a rotor for use in a motor of the slotted stator core type core comprising one or a plurality of first units of steel sheets and one or a plurality of second units of steel sheets, each unit being composed of a plurality of steel sheets each having a number of slot-forming punched portions for forming slots, the number of which differs from the number of slots of a stator core, each punched portion including a main portion and an additional portion extended from the main portion toward the outer circumference of the rotor and inclined in the direction of either one of two sides along the circumference of the rotor relative to the position of the main portion such that each punched portion has an unsymmetrical configuration, each main portion having the center deviated from a distal end of each additional portion by a distance d satisfying the following expression (A) circumferentially of the rotor:

$$\frac{\pi D}{4(z + p)} \leq d \leq \frac{\pi D}{4(z - p)} \qquad (A)$$

where
D = rotor diameter
z = the number of stator slots
p = the number of pole pairs
each first unit being composed of the steel sheets laminated so that the respective additional portions are inclined in the direction of the one side along the circumference of the rotor relative to the positions of the respective main portions and so that the main portions are piled one upon another, each second unit being composed of the steel sheets laminated so that the respective additional portions are inclined in the direction of the other side along the circumference of the rotor relative to the positions of the respective main portions and so that the main portions are piled one upon another;

b) projections formed on each steel sheet so as to be extruded or cut and raised by way of stamping, the projections of each steel sheet being engaged with the projections of the adjacent steel sheet when the steel sheets are laminated;

c) rotor bars embedded in slots of the rotor formed by the punched portions of the steel sheets laminated, respectively; and d) end rings provided for short-circuiting the rotor bars at both ends of the rotor core, respectively.

3. A squirrel-cage rotor according to claim 1, wherein said units of the steel sheets include at least one unit in which the slots are skewed.

4. A squirrel-cage rotor according to claim 3, wherein the rotor core comprises one first unit of the steel sheets and one second unit of the steel sheets such that the additional portions of the steel sheets of each unit are inclined in the direction opposite to each other, either one of the units having skewed slots, the other unit having skewless slots.

5. A squirrel-cage rotor according to claim 3, wherein the rotor core comprises one first unit of the steel sheets and one second unit of the steel sheets such that the additional portions of the steel sheets of each unit are inclined in the direction opposite to each other, each unit having the slots skewed in the direction opposite to each other.

6. A squirrel-cage rotor according to claim 3, wherein the rotor core comprises two first units of the steel sheets and two second units of the steel sheets such that the additional portions of the steel sheets of the two units and the other two units are inclined in the direction opposite to each other, each unit having skewed slots.

7. A squirrel-cage rotor according to claim 1, wherein the slots of the rotor core are of a deep slot type and the distance between each punched portion and the adjacent punched portion is approximately equal in a section from the inner circumferential side to the outer circumferential side of the rotor core.

8. A squirrel-cage rotor according to claim 1, wherein the slots of the rotor core are of a double squirrel-cage type having inner and outer squirrel-cage portions and the distance between a portion of each punched portion composing the outer squirrel-cage and a portion of the adjacent punched portion composing the outer squirrel-cage is approximately equal to the distance between a portion of each punched portion composing the inner squirrel-cage and a portion of the adjacent punched portion composing the inner squirrel-cage.

9. A squirrel-cage rotor for use in a motor of the slotted stator core type comprising:

a) a rotor core comprising one or a plurality of first units of steel sheets and one or a plurality of second units of steel sheets, the units being stacked with a gap between each unit and the adjacent unit, each unit being composed of a plurality of steel sheets each having a number of slot-forming punched portions for forming slots, the number of which differs from the number of slots of a stator core, each punched portion including a main portion and an additional portion extended from the main portion toward the outer circumference of the rotor and inclined in the direction of either one of two sides along the circumference of the rotor relative to the position of the main portion such that each punched portion has an unsymmetrical configuration, each main portion having the center deviated from a distal end of each additional portion by a distance d satisfying the following expression (A) circumferentially of the rotor:

$$\frac{\pi D}{4(z + p)} \leq d \leq \frac{\pi D}{4(z - p)} \qquad (A)$$

where
D = rotor diameter
z = the number of stator slots
p = the number of pole pairs
each first unit being composed of the steel sheets laminated so that the respective additional portions are inclined in the direction of the one side along the circumference of the rotor relative to the positions of the respective main portions and so that the main portions are piled on upon another, each second unit being composed of the steel sheets laminated so that the respective additional portions are inclined in the direction of the other side along the circumference of the rotor relative to the positions of the respective main portions and so that the main portions are piled on upon another;
b) rotor bars embedded in the main portions of the respective slots of the rotor core, each unit of the steel sheets having cooling air paths formed by the additional portions; and
c) end rings provided for short-circuiting the rotor bars at both ends of the rotor core, respectively.

10. A squirrel-cage rotor for use in conjunction with an induction motor of the type including a stator having a slotted stator core and a plurality of stator poles grouped in pairs, wherein the rotor comprises:
a) a rotor core comprising one or a plurality of first units of steel sheets and one or a plurality of second units of steel sheets, each unit being composed of a plurality of steel sheets each having a number of slot-forming punched portions for forming slots, the number of which differs from the number of slots of a stator core, each punched portion including a main portion and an additional portion extended from the main portion toward the outer circumference of the rotor and inclined in the direction of either one of two sides along the circumference of the rotor relative to the position of the main portion such that each punched portion has an unsymmetrical configuration, each main portion having the center deviated from a distal end of each additional portion by a distance d satisfying the following expression (A) circumferentially of the rotor:

$$\frac{\pi D}{4(z + p)} \leq d \leq \frac{\pi D}{4(z - p)} \quad (A)$$

where
D = rotor diameter
z = the number of slots in the stator core
p = the number of pole pairs
each first unit being composed of the steel sheets laminated so that the respective additional portions are inclined in the direction of the one side along the circumference of the rotor relative to the positions of the respective main portions and so that the main portions are piled one upon another, each second unit being composed of the steel sheets laminated so that the respective additional portions are inclined in the direction of the other side along the circumference of the rotor relative to the positions of the respective main portions and so that the main portions are piled one upon another;
b) rotor bars embedded in slots of the rotor core formed by the punched portions of the steel sheets laminated, respectively; and
c) end rings provided for short-circuiting the rotor bars at both ends of the rotor core, respectively.

* * * * *